(12) United States Patent
Zaus et al.

(10) Patent No.: US 9,325,937 B2
(45) Date of Patent: Apr. 26, 2016

(54) RADIO ACCESS TECHNOLOGY INFORMATION STORAGE IN A MOBILE NETWORK

(71) Applicant: Intel IP Corporation, Santa Clara, CA (US)

(72) Inventors: Robert Zaus, Munich (DE); Chen-ho Chin, Deerlijk (BE)

(73) Assignee: Intel IP Corporation, Santa Clara, CA (US)

( * ) Notice: Subject to any disclaimer, the term of this patent is extended or adjusted under 35 U.S.C. 154(b) by 70 days.

(21) Appl. No.: 14/132,525

(22) Filed: Dec. 18, 2013

(65) Prior Publication Data

US 2014/0323128 A1     Oct. 30, 2014

Related U.S. Application Data

(60) Provisional application No. 61/816,662, filed on Apr. 26, 2013.

(51) Int. Cl.
*H04W 4/00*     (2009.01)
*H04N 7/14*     (2006.01)
(Continued)

(52) U.S. Cl.
CPC .............. *H04N 7/141* (2013.01); *H04L 5/0032* (2013.01); *H04L 65/1006* (2013.01); *H04L 65/1016* (2013.01); *H04L 65/1069* (2013.01); *H04L 65/1073* (2013.01); *H04L 65/602* (2013.01);
(Continued)

(58) Field of Classification Search
CPC ........... H04L 29/08108; H04W 60/00; H04W 48/18; H04W 16/14; H04W 4/14
USPC ................. 455/414.1, 435.1–435.2, 448, 466
See application file for complete search history.

(56) References Cited

U.S. PATENT DOCUMENTS 5,331,413 A     7/1994   Diner
5,617,422 A *   4/1997   Litzenberger et al. ........ 370/401
(Continued)

FOREIGN PATENT DOCUMENTS

KR     20080067273 A     7/2008
KR    1020090006281 A     1/2009
(Continued)

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, (Sep. 2013), 182.

(Continued)

*Primary Examiner* — Olumide T Ajibade Akonai
*Assistant Examiner* — Matthew Genack
(74) *Attorney, Agent, or Firm* — Schwegman Lundberg & Woessner, P.A.

(57) ABSTRACT

This disclosure relates generally to radio access technology information storage in a mobile network. The device, method, and/or system may include receiving, by a network node of a mobile network, a request from user equipment related to one or more radio access technologies and transmitting, by the network node in response to the request, a reply message to the user equipment including, for each of the one or more radio access technologies, an indication of an amount of electronic storage the network node may allocate to storage of information related to the one or more radio access technologies.

16 Claims, 5 Drawing Sheets

(51) Int. Cl.

| | | |
|---|---|---|
| H04W 28/02 | (2009.01) | |
| H04W 72/04 | (2009.01) | |
| H04W 52/02 | (2009.01) | |
| H04W 76/04 | (2009.01) | |
| H04W 8/00 | (2009.01) | |
| H04L 5/00 | (2006.01) | |
| H04W 88/02 | (2009.01) | |
| H04W 36/00 | (2009.01) | |
| H04W 60/00 | (2009.01) | |
| H04L 29/06 | (2006.01) | |
| H04L 12/801 | (2013.01) | |
| H04W 76/06 | (2009.01) | |
| H04W 48/06 | (2009.01) | |
| H04W 76/02 | (2009.01) | |

(52) U.S. Cl.
CPC ............ *H04L 65/608* (2013.01); *H04L 65/80* (2013.01); *H04W 8/005* (2013.01); *H04W 28/0289* (2013.01); *H04W 36/0066* (2013.01); *H04W 52/0212* (2013.01); *H04W 60/00* (2013.01); *H04W 72/0486* (2013.01); *H04W 76/048* (2013.01); *H04W 88/02* (2013.01); *H04L 47/10* (2013.01); *H04W 48/06* (2013.01); *H04W 76/027* (2013.01); *H04W 76/068* (2013.01)

(56) References Cited

U.S. PATENT DOCUMENTS

| | | | |
|---|---|---|---|
| 5,686,957 | A | 11/1997 | Baker |
| 6,104,721 | A * | 8/2000 | Hsu ................ 370/431 |
| 7,724,972 | B2 | 5/2010 | Wang et al. |
| 8,019,175 | B2 | 9/2011 | Lee et al. |
| 8,358,613 | B1 | 1/2013 | Giallorenzi et al. |
| 8,452,902 | B2 * | 5/2013 | Jang et al. ............ 710/52 |
| 8,570,359 | B2 | 10/2013 | Ali et al. |
| 8,711,198 | B2 | 4/2014 | Malzbender et al. |
| 8,830,892 | B2 | 9/2014 | Chung et al. |
| 8,922,718 | B2 | 12/2014 | House et al. |
| 8,970,653 | B2 | 3/2015 | Bowen et al. |
| 8,977,063 | B2 | 3/2015 | Lee et al. |
| 2004/0192211 | A1 | 9/2004 | Gallagher et al. |
| 2005/0202823 | A1 | 9/2005 | Shaheen et al. |
| 2008/0096566 | A1 | 4/2008 | Brunner et al. |
| 2008/0141239 | A1 * | 6/2008 | Larsson et al. ........ 717/173 |
| 2009/0040955 | A1 | 2/2009 | Jung et al. |
| 2009/0111478 | A1 * | 4/2009 | Jallon ................ 455/450 |
| 2009/0147685 | A1 | 6/2009 | Malhotra |
| 2009/0210766 | A1 | 8/2009 | Katayama et al. |
| 2009/0280802 | A1 | 11/2009 | Chin et al. |
| 2009/0323613 | A1 * | 12/2009 | Frederiksen et al. ...... 370/329 |
| 2010/0026781 | A1 | 2/2010 | Ali et al. |
| 2010/0067433 | A1 | 3/2010 | Cheng et al. |
| 2010/0074182 | A1 | 3/2010 | Shao |
| 2010/0081391 | A1 * | 4/2010 | Suzuki et al. ........... 455/67.11 |
| 2010/0118111 | A1 | 5/2010 | Bouazizi |
| 2010/0130237 | A1 | 5/2010 | Kitazoe et al. |
| 2010/0202561 | A1 | 8/2010 | Gorokhov et al. |
| 2010/0208607 | A1 | 8/2010 | Chin et al. |
| 2010/0220652 | A1 | 9/2010 | Ishii et al. |
| 2010/0238805 | A1 | 9/2010 | Ludwig et al. |
| 2010/0317394 | A1 * | 12/2010 | Harris et al. ............ 455/522 |
| 2011/0019633 | A1 | 1/2011 | Tajima et al. |
| 2011/0161441 | A1 | 6/2011 | Haruna et al. |
| 2011/0195710 | A1 | 8/2011 | Nas et al. |
| 2011/0217980 | A1 | 9/2011 | Faurie et al. |
| 2011/0217985 | A1 | 9/2011 | Gorokhov |
| 2011/0235706 | A1 | 9/2011 | Demircin et al. |
| 2011/0242975 | A1 | 10/2011 | Zhao et al. |
| 2011/0250888 | A1 | 10/2011 | Ryu et al. |
| 2011/0258313 | A1 | 10/2011 | Mallik et al. |
| 2011/0263255 | A1 | 10/2011 | Alonso-rubio et al. |
| 2011/0268084 | A1 * | 11/2011 | Tanabe et al. ............ 370/331 |
| 2012/0008574 | A1 | 1/2012 | Xiao et al. |
| 2012/0087396 | A1 | 4/2012 | Nimbalker et al. |
| 2012/0176884 | A1 | 7/2012 | Zhang et al. |
| 2012/0281621 | A1 | 11/2012 | Lotfallah et al. |
| 2012/0287881 | A1 | 11/2012 | Arnott et al. |
| 2012/0307794 | A1 | 12/2012 | Shaheen et al. |
| 2012/0320141 | A1 | 12/2012 | Bowen et al. |
| 2013/0039180 | A1 * | 2/2013 | Hong et al. ............ 370/231 |
| 2013/0039339 | A1 | 2/2013 | Rayavarapu et al. |
| 2013/0040671 | A1 | 2/2013 | Zawaideh et al. |
| 2013/0044697 | A1 | 2/2013 | Yoo et al. |
| 2013/0045707 | A1 | 2/2013 | Lee et al. |
| 2013/0051277 | A1 | 2/2013 | Hakola et al. |
| 2013/0101036 | A1 | 4/2013 | Zhou |
| 2013/0170415 | A1 | 7/2013 | Fukuta et al. |
| 2013/0195074 | A1 | 8/2013 | Keller et al. |
| 2013/0258919 | A1 | 10/2013 | Damnjanovic |
| 2013/0301501 | A1 | 11/2013 | Olvera-Hernandez et al. |
| 2014/0176663 | A1 | 6/2014 | Cutler et al. |
| 2014/0219088 | A1 | 8/2014 | Oyman et al. |
| 2014/0225918 | A1 | 8/2014 | Mittal et al. |
| 2014/0286215 | A1 | 9/2014 | Koc et al. |
| 2014/0295864 | A1 | 10/2014 | Gunnarsson et al. |
| 2014/0320587 | A1 | 10/2014 | Oyman |
| 2014/0321272 | A1 | 10/2014 | Bangolae et al. |
| 2014/0321343 | A1 | 10/2014 | Gupta et al. |
| 2014/0321360 | A1 | 10/2014 | Han et al. |
| 2014/0321369 | A1 | 10/2014 | Davydov et al. |
| 2014/0323133 | A1 | 10/2014 | Yeh et al. |
| 2014/0325078 | A1 | 10/2014 | Shan et al. |
| 2015/0195490 | A1 | 7/2015 | Oyman et al. |

FOREIGN PATENT DOCUMENTS

| | | |
|---|---|---|
| KR | 20100054015 A | 5/2010 |
| KR | 1020110051787 A | 5/2011 |
| KR | 1020110102935 A | 9/2011 |
| KR | 1020120099805 A | 9/2012 |
| TW | 201446026 A | 12/2014 |
| TW | 201501498 A | 1/2015 |
| TW | 201507374 A | 2/2015 |
| WO | WO-2007053851 A2 | 5/2007 |
| WO | WO-2012065658 A1 | 5/2012 |
| WO | WO-2013025040 A2 | 2/2013 |
| WO | WO-2014160765 A1 | 10/2014 |
| WO | WO-2014176058 A1 | 10/2014 |
| WO | WO-2014176087 A1 | 10/2014 |
| WO | WO-2014176089 A1 | 10/2014 |
| WO | WO-2014176106 A1 | 10/2014 |
| WO | WO-2014176200 A1 | 10/2014 |
| WO | WO-2014176245 A1 | 10/2014 |
| WO | WO-2014176480 A1 | 10/2014 |

OTHER PUBLICATIONS

"U.S. Appl. No. 14/107,400, Non Final Office Action mailed May 27, 2015", 21 pgs.

"U.S. Appl. No. 14/109,121, Non Final Office Action mailed Apr. 29, 2015", 6 pgs.

"U.S. Appl. No. 14/109,121, Non Final Office Action mailed Aug. 14, 2015", 8 pgs.

"U.S. Appl. No. 14/109,121, Response filed Jul. 28, 2015 to Non Final Office Action mailed Apr. 29, 2015", 10 pgs.

"U.S. Appl. No. 14/132,974, Non Final Office Action mailed Jul. 10, 2015", 8 pgs.

"U.S. Appl. No. 14/135,265, Non Final Office Action mailed Jul. 29, 2015", 11 pgs.

"U.S. Appl. No. 14/140,823, Non Final Office Action mailed Aug. 5, 2015", 6 pgs.

"U.S. Appl. No. 14/140,823, Preliminary Amendment filed Mar. 26, 2014", 3 pgs.

"U.S. Appl. No. 14/141,034, Preliminary Amendment filed Dec. 26, 2014", 7 pgs.

"U.S. Appl. No. 14/141,985, Non Final Office Action mailed Jul. 8, 2015", 20 pgs.

"Control Signaling to Support for Enhanced DL MIMO", R1-104021, 3GPP TSG RAN WG1 Meeting #61bis, (2010), 6 pgs.

(56) References Cited

OTHER PUBLICATIONS

"Discussion on scenarios for evaluation of interference cancellation and suppression schemes", R1-130927, 3GPP TSG-RAN WG1 #72bis, (2013), 3 pgs.

"International Application Serial No. PCT/US2014/031845, International Search Report mailed Aug. 26, 2014", 3 pgs.

"International Application Serial No. PCT/US2014/031845, Written Opinion mailed Aug. 26, 2014", 4 pgs.

"International Application Serial No. PCT/US2014/033965, International Search Report mailed Aug. 7, 2014", 3 pgs.

"International Application Serial No. PCT/US2014/033965, Written Opinion mailed Aug. 7, 2014", 5 pgs.

"International Application Serial No. PCT/US2014/034307, International Search Report mailed Aug. 11, 2014", 3 pgs.

"International Application Serial No. PCT/US2014/034307, Written Opinion mailed Aug. 11, 2014", 5 pgs.

"International Application Serial No. PCT/US2014/034337, International Search Report mailed Aug. 8, 2014", 3 pgs.

"International Application Serial No. PCT/US2014/034337, Written Opinion mailed Aug. 8, 2014", 6 pgs.

"International Application Serial No. PCT/US2014/034480, International Search Report mailed Aug. 26, 2014", 3 pgs.

"International Application Serial No. PCT/US2014/034480, Written Opinion mailed Aug. 26, 2014", 4 pgs.

"International Application Serial No. PCT/US2014/034879, International Search Report mailed Aug. 28, 2014", 3 pgs.

"International Application Serial No. PCT/US2014/034879, Written Opinion mailed Aug. 28, 2014", 8 pgs.

"International Application Serial No. PCT/US2014/034966, International Search Report mailed Aug. 22, 2014", 3 pgs.

"International Application Serial No. PCT/US2014/034966, Written Opinion mailed Aug. 22, 2014", 5 pgs.

"International Application Serial No. PCT/US2014/035409, International Search Report mailed Aug. 26, 2014", 4 pgs.

"International Application Serial No. PCT/US2014/035409, Written Opinion mailed Aug. 26, 2014", 6 pgs.

"Taiwanese Application Serial No. 103113875, Amendment filed Oct. 16, 2014", English Translation, 2 pgs.

"Views on the use of DM RS ports / scrambling sequences for MU-MIMO", R1-103830, 3GPP TSG-RAN WG1 Meeting #61bis, (2010), 6 pgs.

Suckchel, Yang, "An Adaptive Discontinuous Reception Mechanism Based on Extended Paging Indicator for Power Saving in UMTS", In: Vehicular Technology Conference, VTC-2006 Fall. IEEE 64th, [Online]. Retrieved from the Internet: <http://i.eexplore.ieee.org/stamp/stamp.jsparnumber=4109444>, (2006), 5 pgs.

International Application Serial No. PCT/US2014/034480, International Preliminary Report on Patentability mailed Nov. 5, 2015, 6 pgs.

Taiwanese Application Serial No. 103113700, Office Action mailed Oct. 28, 2015, W/English Search Report, 9 pgs.

\* cited by examiner

RADIO ACCESS TECHNOLOGY INFORMATION STORAGE IN A MOBILE NETWORK

This application claims the benefit of priority under 35 U.S.C. 119(e) to U.S. Provisional Patent Application Ser. No. 61/816,662, filed on Apr. 26, 2013, which is incorporated herein by reference in its entirety.

TECHNICAL FIELD

The disclosure herein relates generally to devices, systems, and/or methods for managing the storage of radio access technology in a mobile network.

BACKGROUND

In a wireless network, such as a public land mobile network (PLMN) according to the standards of the third generation partnership project (3GPP), radio access networks for different radio access technologies (RATs) like a General Packet Radio Subsystem Evolved Radio Access Network (GERAN), a Universal Mobile Telecommunications System Terrestrial Radio Acccess Network (UTRAN), and an Evolved-UTRAN (E-UTRAN) can be connected to a common evolved packet core (EPC). The 3GPP standard may support Packet Switched (PS) handover between different RATs. In an example, user equipment (such as mobile or cellular telephone, personal computer, tablet computer, or any device that may communicate as part of a mobile network, also known in the art as a Mobile Station (MS)) which is attached to the PS domain and which has a temporary block follow (TBF) ongoing with a GERAN (e.g., the user device is exchanging packets with the network) may be handed over to a UTRAN or E-UTRAN cell.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
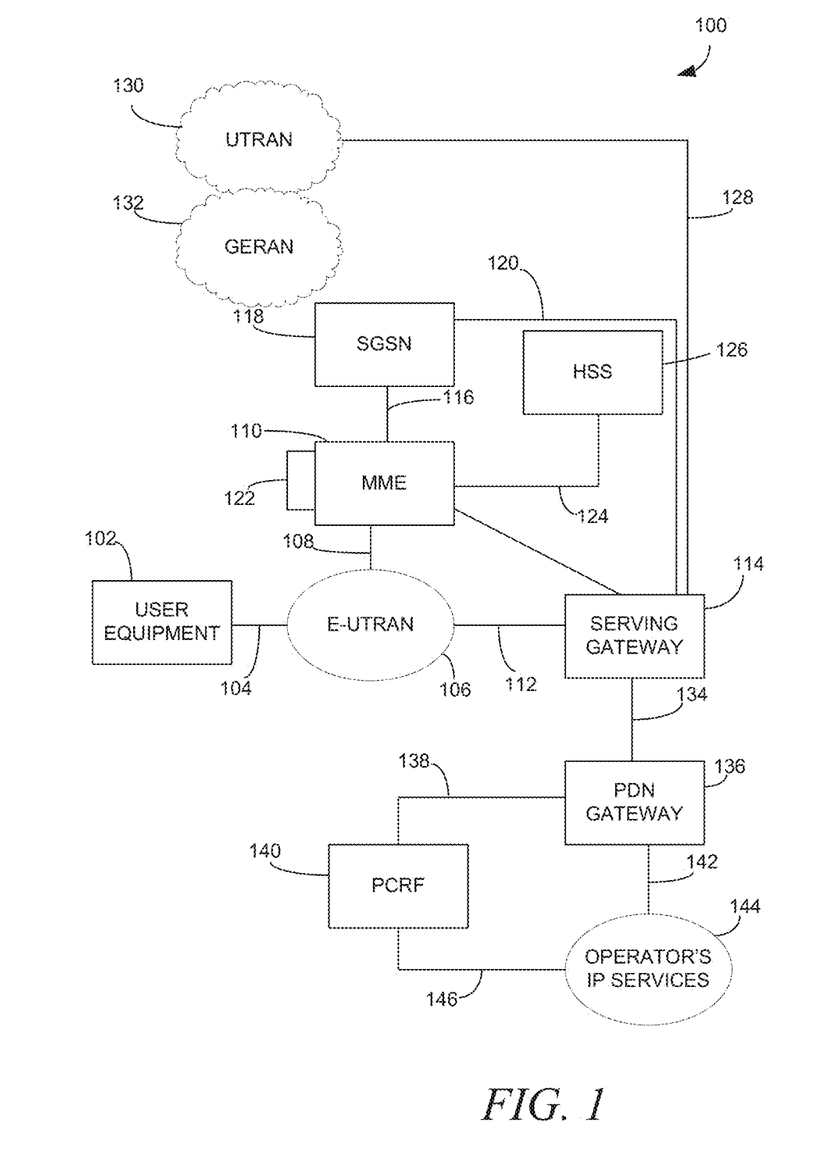
FIG. 1 is a block diagram of a mobile network 100, in an example embodiment.

FIG. 1 is a block diagram of a mobile network 100, in an example embodiment. In various examples, the mobile network 100 is an evolved packet core network supporting, without limitation, GERAN, UTRAN, and/or E-UTRAN. It is to be understood that, while various components may be the particular elements as illustrated, the components may be replaced with similar or suitable components for various related mobile networks and mobile network environments.

User equipment 102 (as noted, also referred to as a Mobile Station (MS)) is communicatively coupled via a radio interface 104 (e.g., Long Term Evolution (LTE-Uu)) to an E-UTRAN 106 system. The E-UTRAN 106 may be communicatively coupled via a S1-MME (Mobility Management Entity) link 108 to a MME 110 and via a S1-U link 112 to a Serving Gateway 114. The MME 110 may be directly connected to the Serving Gateway 114 via an S11 link 115 and may be connected via a S3 link 116 to a Serving General Packet Radio Subsystem Support Node (SGSN) 118, which is itself connected via an S4 link 120 to the Serving Gateway 114. The MME 110 may include an internal S10 link 122 and an S6a link 124 to a High Speed Serial (HSS) interface node 126.

The Serving Gateway 114 may be connected via an S12 link 128 to one or more UTRAN 130 and GERAN 132 networks. The Serving Gateway 114 may further be connected via an S5 link 134 to a public data network (PDN) gateway 136. The PDN gateway 136 may be connected via a link 138 to a policy and changing rules function (PCRF) node 140 and via a SGi link 142 to an operator's IP services 144, such as an IP Multimedia Subsystem (IMS). The PCRF node 140 may be connected to the operator's IP services 144 via a link 146.

In order to prepare a handover between different RATs, the mobile network may utilize information about the radio capabilities of the user device, such as information about RATs, frequency bands, power classes, and so forth supported by the user device. When the radio access network serving the user device decides that a handover to another RAT is desired or needed, the radio capability information may be signaled during handover preparation to a radio controller (e.g., a radio network controller (RNC) for UTRAN, an eNode-B for E-UTRAN, etc) controlling the target cell of the handover. The radio controller may use the radio capability information to reserve an appropriate channel for the user device in the target cell and to build a corresponding signaling message (e.g., a Handover Command) which is then delivered to the user device.

Dependent on, for instance, a number of supported RATs and frequency bands, the amount of radio capability information for inter-RAT handover for a user device may be impractical or undesirable for transfer over or to the network each time a user device establishes a connection to a UTRAN or E-TRAN or a TBF to a GERAN. In various contemporary examples, the amount of radio capability information may be more than one hundred (100) octets of information (an octet is defined as eight (8) bits of information). In such examples, the information may be transferred to a core network node (e.g., un SGSN or a MME) and stored in that node when the user device registers to the core network node during a procedure attaching the user device to the core network node, a routing area procedure, (e.g., via GERAN/UTRAN) or tracking area update procedure (e.g., via E-UTRAN). Later, during handover preparation, the core network node may signal the stored radio capability information to the radio controller (e.g., the RNC for UTRAN, or the eNode-B for E-UTRAN) controlling the target cell of the handover.

As such, developments in the wireless network standards, such as those that standardize additional frequency bands, modulation schemes, duplex modes (e.g., time division duplexing (TDD), frequency division duplexing (FDD), etc.), may add additional radio capability information that may be provided by the user device. Certain mobile networks may be based, at least in part, around core network nodes that may be relatively old or that may include relatively small amounts of electronic storage, and thus, as the information increases, the amount of radio capability information that the user devices may transmit may outstrip the electronic storage space of those core network nodes. Even where the core network nodes are modern, with contemporary electronic storage, the increase in the amount of radio capability information that a user device may transmit may still begin to exceed the core network node's electronic storage capabilities.

In an example, Release 8 of 3GPP may require a SGSN to be able to store up to two hundred fifty-five (255) octets of inter-RAT radio capability information from handover from GERAN to UTRAN, and another two hundred fifty-five (255) octets of inter-RAT radio capability information for handover from GERAN to E-UTRAN (see, e.g., 3GPP TS 23.060, v. 8.17.0, subclauses 6.14 and 6.14.1.1). For the MME, the corresponding requirement is to store up to five hundred ten (510) octets of inter-RAT radio capability information (see, e.g., 3GPP TS 23.401 v. 8.18.0, subclause 5.11.2), including both the information for inter-RAT handover to GERAN and the information for inter-RAT handover to the UTRAN.

However, recent developments suggest that the expected size of the radio capability for E-UTRAN may soon exceed five hundred (500) octets owing to the functional growth and introduction of new frequency bands. In an example, a maximum size of an information element may be about one thousand sixty-three (1263) octets. It may be anticipated that future developments will further increase the size of radio capability information that a user device may transmit and that a core network node may need to manage.

For the attach and routing area update via GERAN, limitations to, for instance, two hundred fifty-five (255) octets may derive from the standard (see, e.g., the 3GPP TS 24.008 protocol) requiring that the information fit into a single information element (IE), and the length of such an information element is given by a length indicator of one (1) octet. In principle it is possible to overcome the limitation to two hundred fifty-five (255) octets by splitting the inter-RAT radio capability information into several segments, each less than or equal to two hundred fifty-five (255) octets and adding new optional information elements to the respective Attach Complete and Routing Area Update Complete message in order to carry these segments, such as per regular protocol evolution.

Further, even if workarounds to information element requirements are found, the user device still may not know whether it is sending a message to a legacy core network node that may not recognize the content and may discard the additional information as an unknown message enhancement. Discarding the additional information may waste network bandwidth and may render even more information useless or of limited value, as a truncation in the information may cause information related to certain frequency bands to be lost, rending other information related to those frequency bands of limited or no value.

In general, the current systems described herein may lack flexibility in the face of new developments. For instance, while it is not currently planned, radio capability information may well begin to exceed one thousand five hundred (1,500) octets, and a solution narrowly drawn to meeting that capacity may be rendered ineffective if and when the radio capability information begins to exceed even that amount of information.

Figure 2:
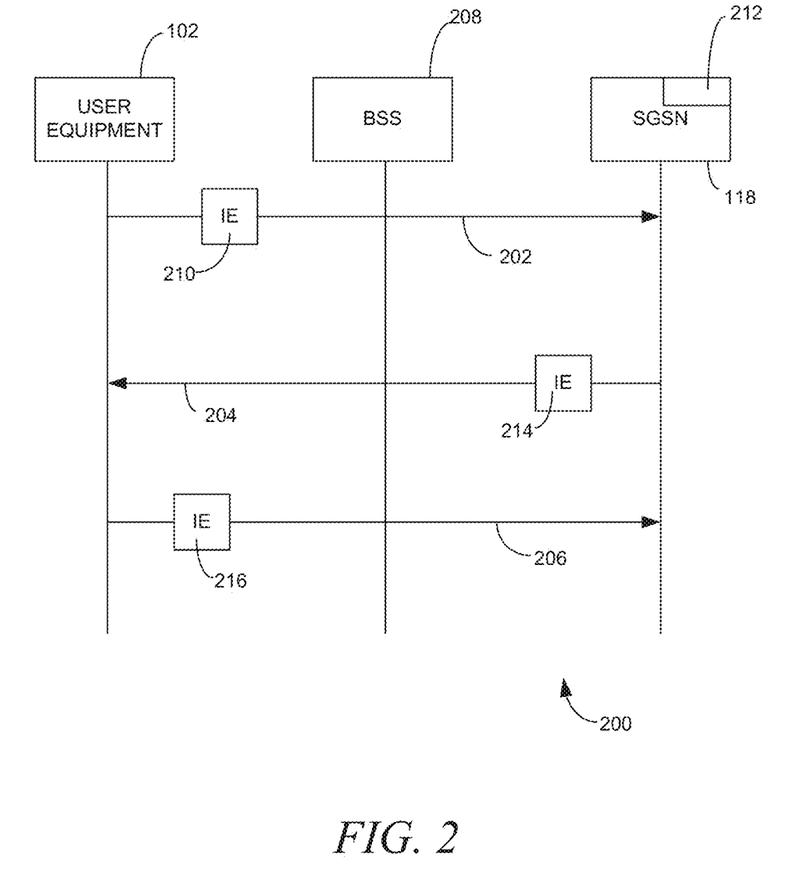
FIG. 2 is a message flow diagram for an attach procedure via GERAN, in an example embodiment.

FIG. 2 is a message flow diagram 200 for an attach procedure via GERAN, in an example embodiment. As illustrated, messages 202, 204, 206 flow from the user equipment 102 to a core network node, as illustrated the SGSN 118, via a base station subsystem (BSS) 208, as known in the art. While the core network node illustrated here is the SGSN 118, it is to be understood that any suitable core network node, such as the MME 110, may be used instead or in addition to the SGSN 118 as appropriate. The BSS 208 may be any of a variety of suitable components of the mobile network 100. In various alternative examples, the messages 202, 204, 206 may route through any suitable components of the mobile network 100. The core network node may be implemented as or incorporate some of the elements of the machine 500 (FIG. 5), at least in part.

When the user equipment 102 initiates a request in the message 202, such as an attach request or a routing area update request and/or procedure, the user equipment 102 provides a user device network capability information element 210. In an example, the information element 210 includes information related to whether or not the user equipment 102 supports packet switched (PS) handover to various RATs, such as UTRAN or E-UTRAN.

The SGSN 118 utilizes the information element 210 and information about the RATs supported by the mobile network 100 (e.g., as provided by or obtained from location information in the SGSN 118) to decide for which target RATs the SGSN 118 will request the user equipment 102 to provide inter-RAT radio capability information. The attach accept message 204 includes a request related to the target RATs as identified by the SGSN 118.

In an example, for each target RAT requested in the attach accept message 204, the SGSN 118 additionally includes in the message 204 an indication of how many octets of the user device's 102 target RAT radio capability information (e.g., related to UTRAN or E_UTRAN) the SGSN 118 is prepared to store in an electronic storage 212. The electronic storage 212 may be any of a variety of computer memory, such as random access memory (RAM), and computer storage, such as a hard disk, flash memory, and the like, known in the art. In various examples, the indication of how many octets the SGSN 118 may allocate may be included within an information element 214 that is generated as part of normal operations of the mobile network 100, such as by including the indication within spare or otherwise unused bits of the information element 214. Alternatively, the indication may be included as part of a dedicated information element 214, e.g., an information element 214 that would not otherwise occur or be generated as part of the operation of the mobile network 100.

In various examples, if the user equipment 102 does not understand the indication, e.g., owing to a lack of an updated protocol, the user equipment 102 may reject the information, for instance, according to conventional error handling rules. In such examples, the information element 214 may be backward compatible with legacy user devices 102, in that, while the information element 214 may not be utilized, the information element 214 may not cause a fault or otherwise disrupt the operation of the mobile network 100 generally and the user equipment 102 specifically. In various examples, the error handling rules may proceed according to the 3GPP 24.008 standard.

In various examples, the number of octets which the SGSN 118 can store for a specific RAT is specified in multiples of a predetermined number of octets. In an example, the predetermined number of octets is two hundred fifty-five (255). In various examples, the predetermined number of octets is selectable according to standards utilized with respect to the mobile network 100, such as to make the predetermined number of octets consistent with a maximum length of an information element 210, 214 according to the standards in effect in the mobile network 100.

In an example, when the user equipment 102 receives the message 204 with the information request the user equipment 102 includes the information in an information element 216 in the message 206 including an attach complete message. The information element 216 may include an inter-RAT handover information element (e.g., for handover to UTRAN) or an E-UTRAN inter-RAT handover information element (e.g., for handover to E-UTRAN). In an example, the information element 216 includes information of up to the predetermined maximum number of octets.

In various examples, if the user equipment 102 has information of greater than the predetermined maximum number of octets for a particular RAT and the information element 214 indicates that the SGSN 118 has allocated a sufficient amount of memory or storage space in the electronic storage 212, the user equipment 102 may transmit the information in multiple information elements 216. Each information element 216 may include information up to the predetermined maximum.

In various examples, if the inter-RAT radio capability information is structured according to frequency bands and the information that the user equipment 102 could provide for a certain target RAT is longer than the information the SGSN 118 can store for the target RAT, the user equipment 102 may include information related to particular frequency bands dependent on whether or not all of the information for the frequency band may be stored in the electronic storage 212. In various examples, the user equipment 102 identifies the frequency bands that may be supported by the electronic storage allocated by the SGSN 118. It is to be recognized that the principles described herein with respect to frequency bands may be applied equally well to any other category of information that may be transmitted; in such examples, the user equipment 102 may identify the scope of the allocated electronic storage and select information that may be transmitted to the SGSN 118 accordingly so as not to exceed the allocated electronic storage.

The user equipment 102 may prioritize the information transmitted, such as in, but not necessarily limited to, circumstances where the allocated electronic storage space is less than the information that the user equipment 102 could transmit, as disclosed herein. In an example, the user equipment 102 may transmit information related to frequency bands that the user equipment 102 knows are in use or has data indicating that the bands are in use in the mobile network 102 or may be utilized by the user equipment 102 before transmitting information related to frequency bands that are not or are not believed by the user equipment 102 to be in use. In various examples, the user equipment 102 may obtain information related to frequency bands in use from inter-RAT neighbor cell information the user equipment 102 may receive in a system information broadcast the user equipment 102 may receive from or based on the cell in which the user equipment 102 is operating. Thus, the user device may adjust what the user device sends as inter-RAT radio capability information to match what the mobile network 100 indicates it can store and what the mobile network 100 indicates as the actual frequency bands that are or may be in use.

In various examples, the user equipment 102 may move around to different parts, e.g., to different physical locations, of or within the mobile network 100. In such examples, the user equipment 102 may find new and/or different frequency bands are being utilized between and among the different parts of the mobile network 100 than the user equipment 102 last indicated in its inter-RAT radio capability information. In such examples, the user equipment 102 may initiate a routing area update or tracking area update procedure, such as by initiating the message 202 or a modification of the message 202, to provide updated inter-RAT radio capability information to the SGSN 118. The user equipment 102 may take into account the most recently indicated electronic storage allocation, or may obtain a new electronic storage allocation from the SGSN 118, such as by initiating the procedure described herein in the message flow 200.

The message flow 200 and the related disclosure are equally applicable to various additional modes of operation of the mobile network 100. In various examples, the attach procedure and its associated protocol messages 202, 204, 206 are generally applicable to a routing area update procedure and its associated protocol messages. The procedure may be applicable to other non-access stratum (NAS) signaling messages as described in 3GPP TS 24.008 and 3GPP TS 24.301.

Figure 3:
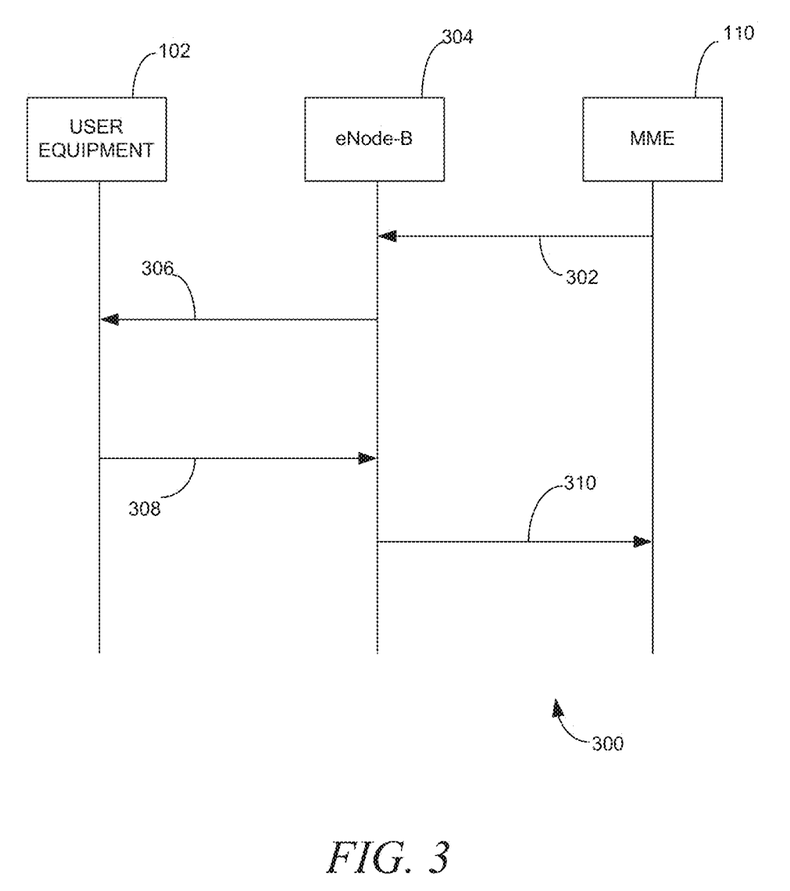
FIG. 3 is a message flow diagram in an evolved packet core (EPC) environment for obtaining inter-RAT radio capabilities of the user equipment 102, in an example embodiment.

FIG. 3 is a message flow diagram 300 in an evolved packet core (EPC) environment for obtaining inter-RAT radio capabilities of the user equipment 102, in an example embodiment. The principles of the message flow diagram 200 may be generally applicable to the principles of the message flow diagram 300, and details provided with respect to the message flow diagram 200 are applicable in the following discussion. The message flow diagram 300 will be described with respect to a E-UTRAN system. In contrast with the GERAN system of the message flow diagram 200, the E-UTRAN system includes a user equipment 102 that exchanges inter-RAT radio capabilities via Access Stratum RRC signaling (see, e.g., 3GPP TS 36.331). The eNode-B radio controller may provide that information through S1-AP signaling (see, e.g., 3GPP TS 36.413).

A S1-AP message 302 may pass from the MME 110 to the eNode-B 304. The message 302 may include an initial context setup request or a user equipment 102 radio capability match request. The message 302 may include an additional indication to the user equipment 102 about the MME's 110 capacity and/or allocation to store inter-RAT radio capabilities of the user equipment 102, as disclosed herein. The eNode-B 304 may send a user equipment 102 capability inquiry message 306. The message 306 may include an additional indication to the user equipment 102 about the MME's 110 capacity or allocation to store the inter-RAT radio capabilities of the user equipment 102.

The user equipment 102 may respond with a user device capability information message 308 to the eNode-B 304. The eNode-B 304 may then transmit an S1-AP message 310 to the MME 110. The message 310 may include one or all of an initial context setup response, a user equipment 102 radio capability match response, and a user equipment 102 capability information indicator. The various messages 302, 306, 308, 310 described herein may be transmitted according to the principles described with respect to the message flow 200, above.

The principles described herein are applicable to various additional circumstances, including, but not necessarily limited to, protocol configuration options information (see, e.g., 3GPP TS 24.008, subclause 9.9.4.11), and to the traffic flow aggregate description information (see, e.g., 3GPP TS 24.008, subclause 9.9.4.15) that the user equipment 102 provides to the mobile network 100.

Figure 4:
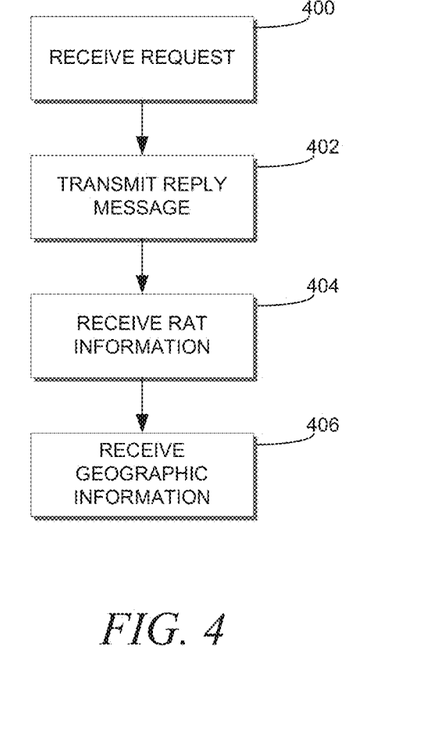
FIG. 4 is a flowchart for storing radio access technology information, in an example embodiment.

FIG. 4 is a flowchart for storing radio access technology information, in an example embodiment. The flowchart may be used with respect to the mobile network 100 or any other suitable network or system.

At 400, a network node of a mobile network receives a request from user equipment related to one or more radio access technologies. In an example, the network node is a first network node, and wherein the request from the user equipment is at least one of a request to register with the first network node or to update a registration to at least one of the first network node or to a second network node.

At 402, the network node, in response to the request, transmits a reply message to the user equipment including, for each of the one or more radio access technologies, an indication of an amount of electronic storage the network node may allocate to storage of information related to the one or more radio access technologies. In an example, the amount of electronic storage the network node may allocate is a multiple of two hundred fifty-five octets.

At 404, the network node receives at least some of the information related to the one or more radio access technologies, the information not exceeding the amount of electronic storage. In an example, the information related to the one or more radio access technologies is received in one or more separately transmitted information elements, each information element including not more than a predetermined maximum number of octets of information related to one radio access technology. In an example, if the information related to the one radio access technology includes more octets of information than the predetermined maximum, receiving at least some of the information includes receiving the at least some of the information in multiple information elements, each information element including not more than the predetermined maximum number of octets.

In an example, at least one of the radio access technologies is associated with at least one predetermined frequency band, and wherein the information received by the network node is information related to the at least one frequency band. In an example, the information related to the at least one frequency band corresponds to at least one of an indication of support of the at least one frequency band by the user equipment and an indication of a maximum nominal output power of transmission in the at least one frequency band by the user equipment. In an example, the at least one frequency band is in use by the mobile network.

At 406, the network node receives information relating to a geographic characteristic of the mobile network, the geographic characteristic is related to at least one of a routing area of the mobile network and a tracking area of the mobile network, the information not exceeding the amount of electronic storage. In various examples, the network node receives the information concurrent with or in place of 404 above.

Figure 5:
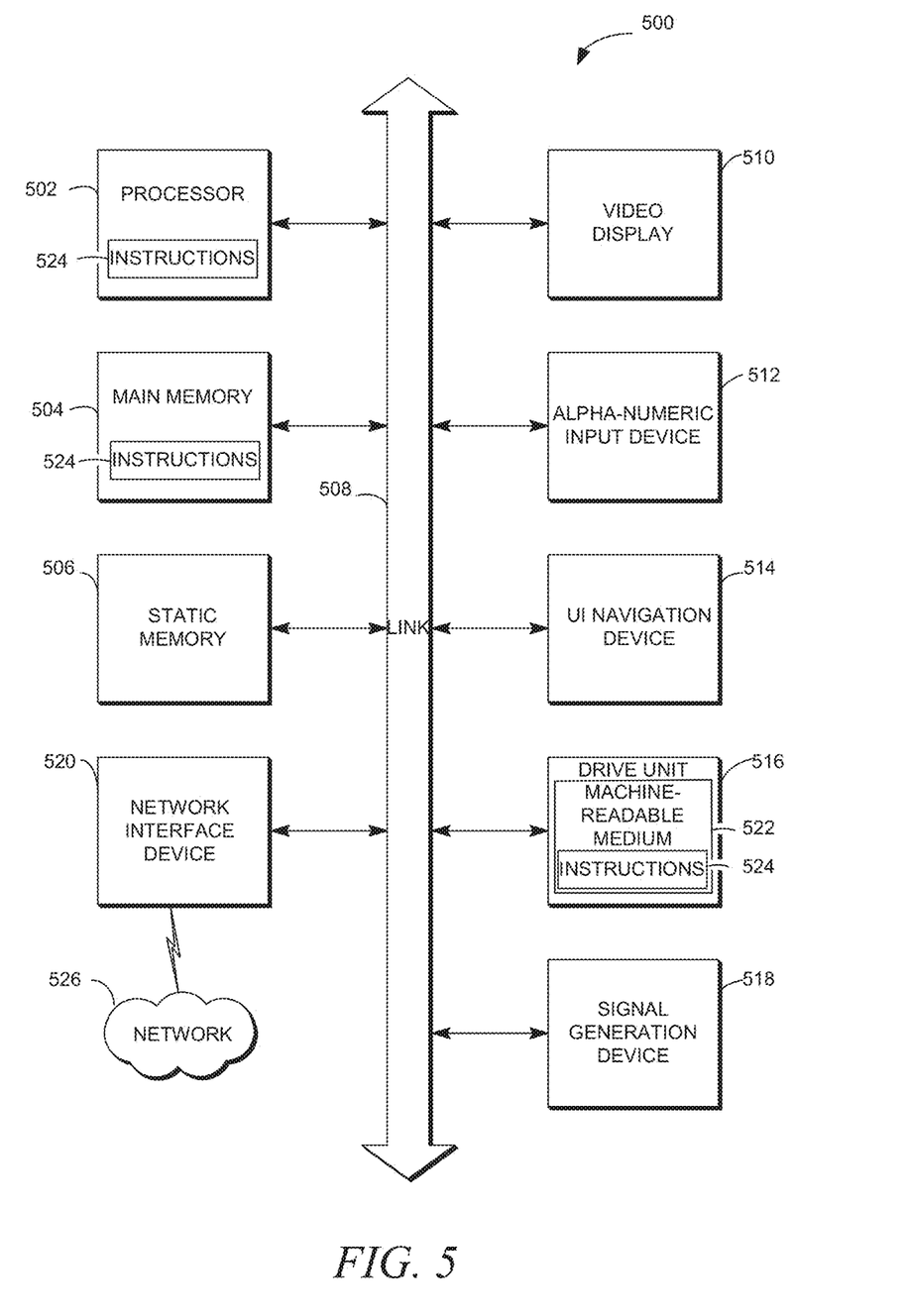
FIG. 5 is a block diagram illustrating components of a machine 700, according to some example embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system and within which instructions 524 (e.g., software) for causing the machine 500 to perform any one or more of the methodologies discussed herein may be executed. In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), a light emitting diode (LED) display, a liquid crystal display (LCD), a projector, or a cathode ray tube (CRT)). The machine 500 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and a network interface device 520.

The storage unit 516 includes a machine-readable medium 522 on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 via the network interface device 520. The network interface device 520 may be a wired transceiver or a wireless transceiver, including one or more transceivers that may be utilized in a cellular or mobile network, such as the mobile network 100.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 500), such that the instructions, when executed by one or more processors of the machine (e.g., processor 502), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

ADDITIONAL EXAMPLES

Example 1 may include subject matter (such as an apparatus, a method, a means for performing acts) that can include receiving, by a network node of a mobile network, a request from user equipment related to one or more radio access technologies and transmitting, by the network node in response to the request, a reply message to the user equipment including, for each of the one or more radio access technologies, an indication of an amount of electronic storage the network node may allocate to storage of information related to the one or more radio access technologies.

Example 2 can include the method of Example 1, further including that the network node is a first network node, and wherein the request from the user equipment is at least one of a request to register with the first network node or to update a registration to at least one of the first network node or to a second network node.

Example 3 can include the method of any one or more of Examples 1 and 2, further including receiving, by the network node, at least some of the information related to the one or more radio access technologies, the information not exceeding the amount of electronic storage.

Example 4 can include the method of any one or more of Examples 1-3, further including that the information related to the one or more radio access technologies is received in one or more separately transmitted information elements, each information element including not more than a predetermined maximum number of octets of information related to one radio access technology.

Example 5 can include the method of any one or more of Examples 1-4, further including that, if the information related to the one radio access technology includes more octets of information than the predetermined maximum, receiving at least some of the information includes receiving the at least some of the information in multiple information elements, each information element including not more than the predetermined maximum number of octets.

Example 6 can include the method of any one or more of Examples 1-5, further including that at least one of the radio access technologies is associated with at least one predetermined frequency band, and wherein the information received by the network node is information related to the at least one frequency band.

Example 7 can include the method of any one or more of Examples 1-6, further including that the information related to the at least one frequency band corresponds to at least one of an indication of support of the at least one frequency band by the user equipment and an indication of a maximum nominal output power of transmission in the at least one frequency band by the user equipment.

Example 8 can include the method of any one or more of Examples 1-7, further including that the at least one frequency band is in use by the mobile network.

Example 9 can include the method of any one or more of Examples 1-8, further including receiving, by the network node, information relating to a geographic characteristic of the mobile network, the geographic characteristic is related to at least one of a routing area of the mobile network and a tracking area of the mobile network, the information not exceeding the amount of electronic storage.

Example 10 can include the method of any one or more of Examples 1-9, further including that the amount of electronic storage the network node may allocate is a multiple of two hundred fifty-five octets.

Example 11 may include subject matter (such as an apparatus, a method, a means for performing acts) that can include a network node for a mobile network including an electronic storage configured to store information related to one or more radio access technologies, a processor configured to determine an amount of unused space in the electronic storage that may be allocated for storage of information related to radio access technologies from user equipment, and a transceiver configured to receive a request from the user equipment related to one or more radio access technologies and transmit a reply message to the user equipment including, for each of the one or more radio access technologies, an indication of an amount of electronic storage the network node may allocate to storage of information related to the one or more radio access technologies.

Example 12 can include the network node of Example 11, further including that the network node is a first network node, and wherein the request from the user equipment is at least one of a request to register with the first network node or to update a registration to at least one of the first network node or to a second network node.

Example 13 can include the network node of any one or more of Examples 11 and 12, further including that the receiver is further configured to receive, at least some of the information related to the one or more radio access technologies, the information not exceeding the amount of electronic storage that may be allocated as determined by the processor.

Example 14 can include the network node of any one or more of Examples 11-13, further including that the information related to the one or more radio access technologies is received in one or more separately transmitted information elements, each information element including not more than a predetermined maximum number of octets of information related to one radio access technology.

Example 15 can include the network node of any one or more of Examples 11-14, further including that, if the information related to the one radio access technology includes more octets of information than the predetermined maximum, the transceiver is configured to receive the at least some of the information in multiple information elements, each information element including not more than the predetermined maximum number of octets.

Example 16 can include the network node of any one or more of Examples 11-15, further including that at least one of the radio access technologies is associated with at least one predetermined frequency band, and wherein the transceiver is configured to receive information related to the at least one frequency band.

Example 17 can include the network node of any one or more of Examples 11-16, further including that the information related to the at least one frequency band corresponds to at least one of an indication of support of the at least one frequency band by the user equipment and an indication of a maximum nominal output power of transmission in the at least one frequency band by the user equipment.

Example 18 can include the network node of any one or more of Examples 11-17, further including that the at least one frequency band is in use by the mobile network.

Example 19 can include the network node of any one or more of Examples 11-18, further including that the transceiver is further configured to receive information relating to a geographic characteristic of the mobile network, the geographic characteristic is related to at least one of a routing area of the mobile network and a tracking area of the mobile network, the information not exceeding the amount of electronic storage.

Example 20 can include the network node of any one or more of Examples 11-19, further including that the amount of electronic storage the processor may allocate is a multiple of two hundred fifty-five octets.

Each of these non-limiting examples can stand on its own, or can be combined with one or more of the other examples in any permutation or combination.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A network node for a mobile network, comprising:
   an electronic storage configured to store information related to one or more radio access technologies;
   a processor configured to determine an amount of unused space in the electronic storage that may be allocated for storage of information related to radio access technologies from user equipment; and
   a transceiver configured to:
   receive a request from the user equipment related to one or more radio access technologies;
   transmit a reply message to the user equipment including, for each of the one or more radio access technologies, an indication of an amount of electronic storage the network node may allocate to storage of information related to the one or more radio access technologies; and
   receive a response from the user equipment comprising radio capability information of the user equipment, the response based on the indication in the reply message.

2. The network node of claim 1, wherein network node is a first network node, and wherein the request from the user equipment is at least one of a request to register with the first network node or to update a registration to at least one of the first network node or to a second network node.

3. The network node of claim 1, wherein the receiver is further configured to receive, at least some of the information related to the one or more radio access technologies, the information not exceeding the amount of electronic storage that may be allocated as determined by the processor.

4. The network node of claim 3, wherein the information related to the one or more radio access technologies is received in one or more separately transmitted information elements, each information element including not more than a predetermined maximum number of octets of information related to one radio access technology.

5. The network node of claim 4, wherein, if the information related to the one radio access technology includes more octets of information than the predetermined maximum, the transceiver is configured to receive the at least some of the information in multiple information elements, each information element including not more than the predetermined maximum number of octets.

6. The network node of claim 3, wherein at least one of the radio access technologies is associated with at least one predetermined frequency band, and wherein the transceiver is configured to receive information related to the at least one frequency band.

7. The network node of claim 6, wherein the information related to the at least one frequency band corresponds to at least one of an indication of support of the at least one frequency band by the user equipment and an indication of a maximum nominal output power of transmission in the at least one frequency band by the user equipment.

8. The network node of claim 6, wherein the at least one frequency band is in use by the mobile network.

9. The network node of claim 1, wherein the transceiver is further configured to receive information relating to a geographic characteristic of the mobile network, the geographic characteristic is related to at least one of a routing area of the mobile network and a tracking area of the mobile network, the information not exceeding the amount of electronic storage.

10. The network node of claim 1, wherein the amount of electronic storage the processor may allocate is a multiple of two hundred fifty-five octets.

11. The network node of claim 1, wherein:
   the request is one of an attach request or a routing area update request for the user equipment, the request comprising information related to whether or not the user equipment supports packet switched handover to the one or more radio access technologies,
   in response to the request, determine for which target radio access technology the network node will request the user equipment to provide inter-radio access technology radio capability information,
   the reply comprises the request to provide the inter-radio access technology radio capability information,
   the radio capability information of the user equipment comprises the inter-radio access technology radio capability information, and
   the response from the user equipment comprises an attach complete message.

12. The network node of claim 1, wherein:
   the indication of the amount of electronic storage the network node may allocate is configured to be included within an information element generated as part of normal operations of the mobile network by including the indication within spare or otherwise unused bits of the information element.

13. The network node of claim 1, wherein:
   the indication of the amount of electronic storage the network node may allocate is configured to be included within a dedicated information element that would not otherwise occur or be generated as part of the operation of the mobile network.

14. The network node of claim 1, wherein:
if inter-radio access technology radio capability information is structured according to frequency bands and the information to be received by the network node for a target radio access technology is longer than the information the network node can store for the target radio access technology, the transceiver is configured to receive information related to particular frequency bands dependent on whether or not the information for the frequency band may be stored in the electronic storage.

15. The network node of claim 1, wherein the transceiver is configured to:
receive information regarding frequency bands on which the user equipment has data indicating that the frequency bands are in use in the mobile network or may be utilized by the user equipment before receiving information related to frequency bands that are not or are not believed by the user equipment to be in use.

16. The network node of claim 1, wherein:
the transceiver is configured to transmit an indication to the user equipment about the capacity or allocation of the network node to store inter-radio access technology radio capabilities of the user equipment prior to receiving the request from the user equipment.

\* \* \* \* \*